Oct. 2, 1934.　　　　　G. DE ZOETEN　　　　　1,975,226
POWER FACTOR MEASUREMENTS IN HIGH TENSION CABLES
Filed Jan. 17, 1930
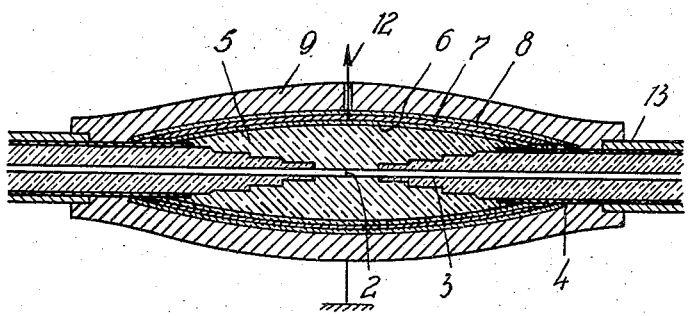
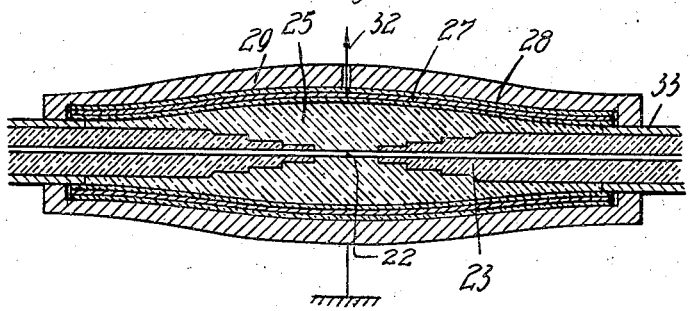
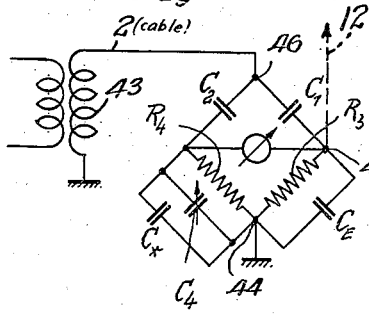
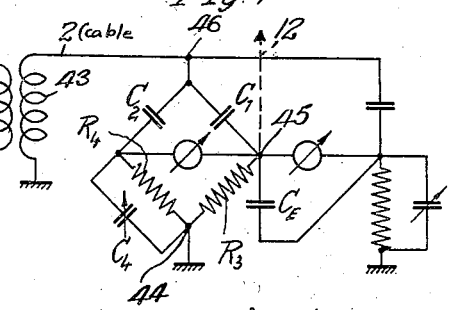

Patented Oct. 2, 1934

1,975,226

UNITED STATES PATENT OFFICE 1,975,226

POWER FACTOR MEASUREMENTS IN HIGH TENSION CABLES

Gijsbertus de Zoeten, Arnhem, Netherlands, assignor to N. V. Tot Keuring Van Electrotechnische Materialen, Arnhem, Netherlands, a Netherlandish corporation Application January 17, 1930, Serial No. 421,410
In Germany January 18, 1929

3 Claims. (Cl. 175—183)

My invention relates to improvements in apparatus for capacitance measurements.

Measurements of the electric properties and particularly capacity and power factor measurements of the cable dielectric, form an essential feature for the efficiency and the degree of safety of an electric cable plant, for instance of a long distance transmission line, more particularly a high-tension cable plant. These power factor measurements are effected in a suitable manner by connecting the one pole of the testing apparatus, such as a measuring bridge, to the cable conductor and the other pole to the lead sheath of cable. By applying this measuring bridge method the lead sheath represents one condenser surface and the cable conductor the other condenser surface. The dielectric to be measured with respect to dielectric losses and power factor between these both condenser surfaces is the cable dielectric, in particular consisting of layers of impregnated wood pulp paper tapes. In this way it was heretofore only possible to test the power factor of the total cable dielectric of the cable plant as a whole unit, so that the characteristic electric values of very small parts become submerged in the mean value of the total plant, which small parts as regards space or capacity do not practically influence the mean value. While in the factory or in the laboratory all the individual parts of a long distance line or a cable plant may easily be separately subjected to power factor measurements even in small parts of the dielectric, for instance such as cable joints, potheads and bushings, it has been hitherto impossible to measure the dielectric power factor of such parts of very short length and of small capacity in an already installed electric cable plant. It is, however, just in an installed cable very important to carry out electric measurements at individual parts, such as cable joints or boxes, or pot-heads and the like because just such joints may prove to be particularly weak points of the plant. For this purpose according to my invention power factor measurements are made of these individual small parts of the cable plant. Since these small parts, such as joints and the like, affect the measurements as condenser-like systems and since the condenser surfaces are on the one hand the current-carrying cable conductor itself and on the other hand the cable lead sheath or the parts electrically connected with it, they may either be brought outside at the high-tension side, i. e. at the cable conductor, or at the ground side, i. e. at the cable lead sheath if conducting layers are provided in the neighborhood of these condenser surfaces. These conducting layers or measuring coatings are only slightly insulated from the said condenser surfaces and connected to a conductor or line passing outside. Normally, i. e. when no measurements are taken, they can be connected by a simple change-over switch to the respective condenser surfaces of the cable.

My invention relates to apparatus which enables such parts of small capacity or small bulk, within a total plant ready for operation, to be measured separately. According to my invention there is provided for instance at one surface of the part, whose dielectric strength is to be examined by measurement, an insulated conducting coating and from this coating a conductor is passed outward where it can be connected to the measuring instrument or ground, as the case may be.

In the drawing affixed to my specification embodiments of my invention are illustrated by way of example. In the drawing Fig. 1, shows diagrammatically the application of my invention to the junction box of a metallically shielded single core cable, Fig. 2, the application of my invention to the junction box of a standard unshielded single core cable, Fig. 3, a wiring diagram of a measuring bridge by means of which the disturbing action of the ground capacity on the bridge balance may be eliminated, and Fig. 4, a wiring diagram of another type of bridge which likewise renders the ground capacity ineffective during the measurement.

Fig. 1 of the drawing illustrates diagrammatically how two single conductor cable sections, having metallically shielded cores are connected with each other in a junction box. In this figure 2 is the joint of the conductors, 3 the stepped original conductor insulation, 4 the original metallic shield on the surface of the insulation, 5 the paper insulation wound on during the installation and 6 the impregnated paper strip layer which overlaps the original metallization for a certain distance. To the impregnated paper strip layer 6 is applied a metallic layer of suitable material 7 which however in the longitudinal direction is slightly shorter than the paper layer 6 and which slightly overlaps the original metallization 4 by a small distance, but is insulated from it by the paper strip layer 6. The metal layer 7 serves as measuring coating and by the capacitive overlapping over the conductor metallization 4, unduly large steps of the electric field strength and concentrated stresses are effectively avoided. Impregnated paper strip 8 serves for the insulation of the measuring coating 6 from the wall of the box 9 which is grounded and connected with the cable sheath 13. As lead from layer 7 out of the box 9 serves a lightly insulated line 12 which in normal operation is grounded.

For metallized multiple-conductor cables the just described single construction is multiplied within the same box, for non-metallized multiple-conductor cables the design corresponds with that of a non-metallized single conductor cable.

As another feature of my invention as applied to multi-core cables, the metallic shielding of shielded cores is preferably interrupted at both ends of the element to be measured, such as the junction box, so that the metallization of the part itself, such as the layer 7 in Fig. 1 serves as a measuring coating.

Although I have described my invention more particularly with reference to its application to junction boxes, it will be readily understood that it is equally applicable to any other accessory parts of a cable plant, such as elbows or also inclined portions of the installation, if it appears desirable to supervise such parts.

In Fig. 2 is illustrated the corresponding arrangement for a cable with an unshielded single conductor. Referring to this figure 22 is the conductor joint, 23 the stepped original conductor insulation and 25 the paper strip insulation applied during the insulation of the cable joint. Over the paper insulation 25 is applied a metallic sleeve 27 serving as measuring coating and which capacitively overlaps the cable sheath 33 with the same effect as described with reference to shield 4 in Fig. 1. The impregnated paper tape 28 insulates the measuring coating 27 from the wall of box 29, which latter is grounded and connected with the cable sheath 33. 32 is a lightly insulated lead to the measuring coating 27 connected to ground in normal working.

In pot-heads the metallic layer is preferably located at the conductor, that is at the high-tension side, while at the other parts of the cable plant at which the high-tension is not directly accessible from outside, the metallic layer is preferably placed underneath the lead sheath or underneath the covering of joint that is at the ground side as shown in Figs. 1 and 2.

The power factor measurements for small parts within the installed cable line are carried out by a bridge measuring method. The measuring line from the measuring coating within the measured object to the measuring bridge may become very long because it is necessary to carry it up to bridge measuring point near the pothead, together with the high-tension loaded cable conductor which is connected to a branching point of the bridge. Since such a measuring line has a large ground capacity, even if a telephone cable of low specific capacity were employed, and since this ground capacity is connected in parallel to one bridge resistance the bridge balance will change in undesirable manner. This drawback is eliminated in a well-known manner by determining the value of the ground capacity and compensating it by a correspondingly calculated inductivity or a capacity in the respective arms of the bridge.

For measuring purposes the test lead 12 (Fig. 1 or 32 (Fig. 2) is connected to the branching point 45 of a measuring bridge as shown in Fig. 3 (Schering-bridge) and Fig. 4 (Wagner-bridge). For test leads a shielded conductor is used. The other branching point 46 is connected to the cable conductor 2 Fig. 1, or 22 Fig. 2, which is fed by a high-tension electric source 43. Point 44 is grounded. Thus, the capacity $C_1$ embodies the combination: measuring coating-cable conductor, separated by the dielectric of the test object of the cable plant, such as the cable box. In Figs. 3 and 4, $C_2$ is the comparison condenser without dielectric losses, and $C_E$ the ground capacity of the measuring lead whose metallic shield is connected to ground. $R_3$ and $R_4$ are bridge resistances. $C_4$ is a variable condenser for compensating the capacitive component, and in Fig. 3 C is a capacity serving for the compensation of the ground capacity of the measuring lead which is calculated from $C_E$, $R_3$ and $R_4$. This capacity $C_E$ may be replaced, if desired, by giving $R_3$ a suitable inductive value.

Another suitable manner to render the ground capacity $C_E$ of the measuring lead harmless for the capacity measurements consists in the application of an auxiliary bridge arm according to the bridge measuring method proposed by K. W. Wagner in an article, appearing in the "Elektrotechnische Zeitschrift 1911", page 1001 (see Fig. 4 of that article). The metallic shield of the measuring lead is not connected as in Fig. 3 of the present case to ground but, as shown in Fig. 4, is brought to the potential of the measuring lead itself by means of the auxiliary bridge arm, so that no capacitive loading current is produced by the capacity of the measuring lead.

Although I have described my invention more particularly with reference to its application to cable joints, it will be readily understood that it is equally applicable to any other curved or inclined parts of a cable plant, i. e. cable lengths of inclined position, if it appears desirable to supervise such parts.

I claim as my invention:

1. In an arrangement for carrying out with a measuring instrument electric power factor measurements of parts of small capacity of electric cable plants, an insulated continuous conductive measuring coating located at one condenser surface of the part to be tested, said measuring coating having a lead for connecting the coating with said measuring instrument, and means for compensating the ground capacity of said lead during the capacity measurement of the part.

2. In an arrangement for carrying out with a measuring instrument electric power factor measurements of parts of small capacity of electric cable plants, an insulated continuous conductive measuring coating located at one condenser surface of the part to be tested, said measuring coating having a lead for connecting the coating with said measuring instrument, said lead having a shielding and circuit connections between said measuring instrument and said shielding for balancing the ground capacity of said lead during the measurement of the part.

3. In an arrangement for carrying out with a measuring instrument electric power factor measurements of parts of small capacity of electric cable plants, an insulated continuous conductive measuring coating located at one condenser surface of the part to be tested, said measuring coating having a lead for connecting the coating with said measuring instrument, said lead having a shielding and an auxiliary circuit connected to said measuring instrument for balancing the ground capacity of said lead during the capacity measurement of the part.

GIJSBERTUS DE ZOETEN.